(12) United States Patent
Deiretsbacher et al.

(10) Patent No.: US 11,073,822 B2
(45) Date of Patent: Jul. 27, 2021

(54) PROVISION OF PROCESS VALUES IN A PROCESS INSTALLATION

(71) Applicant: SIEMENS AKTIENGESELLSCHAFT, Munich (DE)

(72) Inventors: Karl-Heinz Deiretsbacher, Effeltrich (DE); Markus Erlmann, Mainleus (DE); Sven Kerschbaum, Fürth (DE); Frank Volkmann, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 105 days.

(21) Appl. No.: 15/514,308

(22) PCT Filed: Sep. 25, 2014

(86) PCT No.: PCT/EP2014/070523
§ 371 (c)(1),
(2) Date: Mar. 24, 2017

(87) PCT Pub. No.: WO2016/045736
PCT Pub. Date: Mar. 31, 2016

(65) Prior Publication Data
US 2017/0300043 A1 Oct. 19, 2017

(51) Int. Cl.
*G06F 15/16* (2006.01)
*G05B 19/418* (2006.01)
*H04L 29/06* (2006.01)

(52) U.S. Cl.
CPC ............ *G05B 19/4186* (2013.01); *G05B 2219/25022* (2013.01); *G05B 2219/33149* (2013.01); *H04L 67/42* (2013.01); *Y02P 90/02* (2015.11)

(58) Field of Classification Search
CPC ...... G05B 19/4186; G05B 2219/25022; G05B 2219/33149; H04L 67/42; Y02P 90/185
(Continued)

(56) References Cited

U.S. PATENT DOCUMENTS

| 8,874,873 B2 * | 10/2014 | Bitner | G06F 3/0631 |
| | | | 709/226 |
| 2001/0030963 A1 * | 10/2001 | Yoshimura | H04L 29/06 |
| | | | 370/393 |

(Continued)

FOREIGN PATENT DOCUMENTS

| CN | 101656760 A | 2/2010 |
| CN | 102143164 A | 8/2011 |

(Continued)

*Primary Examiner* — Thuong Nguyen
(74) *Attorney, Agent, or Firm* — Henry M. Feiereisen LLC (57) ABSTRACT

A method for operating a server device in a system is disclosed. The server device determines a current process value of at least one process parameter of a process controlled by the system and transmits the determined current process values to a plurality of client devices in the system for each process parameter or a subset thereof via a data network. According to the invention, the server device forms a variable group for at least one process parameter which is to be transmitted to more than one of the client devices. The server device then combines in each case the current process values of the at least one process parameter in the variable group at the different transmission times to form a single multi-target message and at the different transmission times to form a single multi-target message and transmits the multi-target message to a group address in the data network.

9 Claims, 2 Drawing Sheets

(58) Field of Classification Search
USPC ........ 709/236, 231, 230, 224, 217; 370/393, 370/349, 473, 236, 466, 345, 330, 329
See application file for complete search history.

(56) References Cited

U.S. PATENT DOCUMENTS

| | | | |
|---|---|---|---|
| 2004/0015283 A1* | 1/2004 | Eckert | B60T 8/00 701/70 |
| 2004/0034712 A1* | 2/2004 | Rajwan | H04L 1/0002 709/231 |
| 2004/0230693 A1 | 11/2004 | Baus et al. | |
| 2004/0230694 A1 | 11/2004 | Baus et al. | |
| 2005/0128998 A1* | 6/2005 | Jelitto | H04L 1/0001 370/349 |
| 2005/0165940 A1* | 7/2005 | Rode | H04L 12/40032 709/230 |
| 2009/0092050 A1* | 4/2009 | Buch | H04L 51/12 370/236 |
| 2009/0092152 A1* | 4/2009 | Rajakarunanayake | H04L 1/0009 370/473 |
| 2010/0161603 A1* | 6/2010 | Caceres | G06F 16/2465 707/736 |
| 2011/0081868 A1* | 4/2011 | Kim | H04W 24/10 455/67.11 |
| 2011/0298301 A1* | 12/2011 | Wong | G01D 4/004 307/116 |
| 2012/0204212 A1* | 8/2012 | Lester | H04N 7/17318 725/65 |
| 2013/0044701 A1* | 2/2013 | Koorapaty | H04L 5/0053 370/329 |
| 2013/0070788 A1* | 3/2013 | Deiretsbacher | H04L 29/10 370/466 |
| 2013/0122885 A1* | 5/2013 | Kojima | G05B 23/0251 455/418 |
| 2013/0173905 A1* | 7/2013 | Inatomi | H04L 9/0833 713/150 |
| 2013/0245799 A1* | 9/2013 | Terada | H04H 60/04 700/94 |
| 2013/0329719 A1* | 12/2013 | Chung | H04W 76/27 370/345 |
| 2014/0059168 A1* | 2/2014 | Ponec | H04L 67/02 709/217 |
| 2014/0086198 A1* | 3/2014 | Andrews | H04W 72/1236 370/330 |
| 2014/0211708 A1* | 7/2014 | Zhao | H04L 1/1854 370/329 |
| 2015/0229652 A1 | 8/2015 | Liu et al. | |
| 2016/0073443 A1 | 3/2016 | Deiretsbacher et al. | |
| 2016/0173561 A1* | 6/2016 | Zheng | H04L 69/08 709/217 |
| 2017/0300043 A1* | 10/2017 | Deiretsbacher | G05B 19/4186 |

FOREIGN PATENT DOCUMENTS

| | | |
|---|---|---|
| CN | 103780589 A | 5/2014 |
| WO | WO 2013178270 A1 | 12/2013 |

* cited by examiner

FIG 1

PROVISION OF PROCESS VALUES IN A PROCESS INSTALLATION

CROSS-REFERENCES TO RELATED APPLICATIONS

This application is the U.S. National Stage of International Application No. PCT/EP2014/070523 filed Sep. 25, 2014, which designated the United States and has been published as International Publication No. WO 2016/045736.

BACKGROUND OF THE INVENTION

The invention relates to an installation for controlling a process, for example a production process, in which a server device ascertains the current process value for at least one process parameter, for example a temperature, at different transmission times and distributes said process value to multiple other devices, in this case client devices. The invention also includes a corresponding server device and a corresponding client device and also a method for operating the server device.

In automation-engineering installations, or installations for short, there is the need for process information, that is to say respective current process values for different process parameters, such as a temperature, a rotation speed, a pressure, for example, to be interchanged between different devices. For this, a standard protocol has become established that is referred to as OPC Unified Automation/Architecture (OPC UA) from the OPC Foundation (OPC-OLE for process control, OLE—object linking and embedding).

In such scenarios, it is frequently the case that multiple consumers of the process information, i.e. client devices, are interested in the same process information, which the OPC UA server, i.e. the server device, therefore sends repeatedly, namely at least once each time, to the various client devices. Added to this is the fact that OPC UA secures this data transport, e.g. by means of acknowledgments of receipt. For this, OPC UA assumes that the client devices and the server device know their respective identity in the data network. This is made certain between the respective client device and the server device by means of a peer-to-peer connection, which is referred to as an OPC UA session.

During operation of an installation, it can occur that a server device is overloaded by the management of connections or sessions and the repeated transmission of current process values. In this case, there is then a need to provide a server device that has more complex circuitry and hence is more expensive to manufacture. In addition, the multiple transmission of process values can adversely affect the communication behavior of the installation, since the multiple transmission of the process values blocks communication by other devices.

SUMMARY OF THE INVENTION

The invention is based on the object of making an interchange of process values between devices of an installation efficient.

The object is achieved by the subjects of the independent patent claims. Advantageous developments of the invention are provided by the features of the dependent patent claims.

According to the invention, a method is provided that is used to operate a server or server device in an installation. The installation may be an automation-engineering installation that, by way of example, acts to produce a product (e.g. to manufacture a motor vehicle) or to perform a process (such as power generation on the basis of nuclear power, for example) or to control a system (for example controlling traffic lights in a city district). The process may also be arranged inside a single piece of equipment, for example it may be the control of a robot for coordinating individual devices of the robot, for example its sensors and actuators. By way of example, another piece of equipment may be a production station, for example a paint station or a bottle filling station. A process can also provide the desired functionality of the station inside such stations. Therefore, the term "installation" preferably also covers such a piece of equipment and such a station.

The controlled process has at least one process parameter that can change as a result of the execution of the process, for example a temperature, a pressure, a rotational position, for example of a rotor or of a shaft, or a speed, for example on an assembly line. The server device ascertains a respective current process value, that is to say the current temperature or the current pressure, for example, for the at least one process parameter at different transmission times. To this end, the server device can have a temperature sensor or a pressure sensor or a motor controller for an electric motor or a controller for a robot, for example.

The respective current process value of the at least one process parameter is intended to be transmitted to multiple client devices of the installation. A client device may likewise be a motor controller or another actuator controller or a sensor, for example. In this case, each of the client devices may need the current process value from the server device either for each of the at least one process parameter or just for a subset thereof, that is to say one or a few. Accordingly, the server device transmits the respective ascertained current process value for each or a subset of the at least one process parameter to each of multiple client devices of the installation via a data network, for example an Ethernet or a Profinet bus, at the respective transmission time.

In order to make the data traffic produced on the data network efficient in this case, the server device carries out the following steps. The server device forms a subnet for at least one process parameter that is to be transmitted to more than one of the client devices. In the subnet, there is thus an indication of all those process parameters whose respective current process value is to be transmitted to more than one client device at each of the different transmission times. The subnet thus describes a parameter group or a variable group. From each process parameter or each variable that the subnet contains, it is necessary for the current value to be reported to more than one device, i.e. the respective current value needs to be transmitted to more than one device via the data network.

Accordingly, the server device combines the respective current process values of the at least one process parameter of the subnet into a single multitarget message, i.e. a data record or some other type of message, at the different transmission times. A respective copy of this multitarget message is now not transmitted to each of the devices, but rather the server device transmits the multitarget message into the data network to a group address. Depending on the communication standard used for the data network, the group address may be a multicast address or a broadcast address, for example, if the IP (Internet protocol) communication standard is used.

The invention results in the advantage that computation power is saved in the server device, since the process values do not need to be sent repeatedly and the server device accordingly needs to condition the process values only once for multiple client devices. This is advantageous particularly at the field level of an installation, where a server device may be a low-power device, for example a sensor.

The method naturally also comprises embodiments in which the server device forms multiple different subnets. Furthermore, the term server device is not limited to a device that is operated exclusively as a data source for process values. The server device for the at least one process parameter may at the same time, in connection with at least one other process parameter, be a client device that receives current process values for the at least one other process parameter from another server device.

What subnet is formed in the server device according to the invention can be set, for example by configuring the server device when configuring the installation during advance planning. This results in the advantage that no computation resources are needed for ascertaining the subnet during operation of the installation.

A further advantage is obtained if the negotiation of the subnet is performed during connection setup between server device and client devices, so that the subnet is formed dynamically based on the current need of the client devices. The installation is then self-configuring. To this end, the server device receives from each client device a respective enquiry message, i.e. a data record or a message, that contains an indication of from which of the at least one process parameter the process values are to be transmitted to the client device. The enquiry message is a digital message that is sent from the respective client device to the server device via the data network. The enquiry message thus defines the client device e.g. the subset of those process parameters for which the client device needs the process values. Another term for this process is also subscription. The server device then forms the subnet on the basis of received enquiry messages.

The server device sets the group address for the subnet and communicates the group address to those devices whose enquiry message contains an indication of the at least one process parameter of the subnet. Hence, the client devices know that the process values for at least one process parameter that they need are not sent to their client address directly, but rather are sent to a group address. Accordingly, the respective client device needs to read the multitarget messages that are addressed to this group address from the client devices from the data network. This embodiment has the advantage that the server device dynamically matches the subnet to the need of the client devices during operation of the installation. This embodiment accordingly also comprises variants in which, during operation of the installation, a client device sends an enquiry message again and the server device re-sets the intersection subnet.

The method according to the invention can be combined with the known standard protocol OPC UA established for automation-engineering installations without difficulty. In this regard, one embodiment provides for the server device to receive from at least one of the client devices the respective enquiry message in the configuration phase, that is to say e.g. when the installation is started up, via a network connection during an OPC-UA session according to the OPC-UA standard. Optionally, the OPC UA session can be closed at the end of the configuration phase, that is to say whenever the server device and the client devices start actual operation of the installation, namely control of the process. This may make sense if otherwise e.g. no OPC-UA-compliant communication is needed in the installation during the operating phase. A session is therefore advantageously necessary only for setting up and managing a cyclic data transmission of this kind for the process values. While the actual cyclic update of process values proceeds, that is to say in the normal operation phase of the installation, no management involvement is needed for a session, either on the part of the client devices or on that of the server device. The configuration phase can also be reinitiated cyclically, for example after a standby in the installation.

In an installation, the server device can transmit the data packets, that is to say the respective multitarget message with the current process values, cyclically for each variable group, that is to say each subnet. In this case, the transmission behavior of the server device is set by transmission parameters, that is to say, by way of example, the update rate, which stipulates the transmission times, the maximum number of variables that a multitarget message contains, deadbands (trigger values that, when exceeded or undershot, prompt a process value to be transmitted). Thus it can occur that although two client devices desire the current process values for the same process parameter, they need a different transmission behavior from a server, for example different update rates. In order to allow for this, one embodiment of the method provides for the following steps. The server device receives from each client device at least one respective transmission parameter value, prescribed by the client device, for a transmission parameter, that is to say the value 200 per second for an update rate, for example. To form the subnet, the server device selects the subnet from the at least one process parameter, from which it can ascertain current process values, such that the transmission parameters of each process parameter of the subnet satisfy a predetermined similarity criterion. In other words, only process parameters for which a transmission behavior that is similar based on similarity criterion is prescribed by the client devices are combined to form the subnet. If, by way of example, an update rate of one current process value per minute is needed for a temperature, but an update rate of 100 process values per minute is needed for a rotation speed, then it may make sense not to combine these two process parameters (temperature, rotation speed) in the same intersection, even though the process values are to be transmitted to the same group of client devices. The similarity criterion can prescribe a predetermined maximum absolute difference between the transmission parameters of the client devices, for example. By way of example, the similarity criterion can prescribe that the transmission parameter values must be an integer multiple of one another. This embodiment results in the advantage that the subnet formed or the multiple subnet formed can be matched more precisely to the need of the installation.

The resultant transmission behavior is negotiated particularly using the standard OPC mechanism when a subscription is set up. The reason is that the similarity criterion preferably also allows differences in the transmission parameter values, in the manner described. In order now to find specific transmission parameter values for transmitting each multitarget message, one embodiment provides for the server device to ascertain a respective optimum transmission parameter value for at least one transmission parameter (for example the transmission times, i.e. update rate, maximum number of variables, deadbands) on the basis of all transmission parameter values prescribed for the subnet, based on a predetermined optimization criterion. By way of example, the optimization criterion can state that the largest transmission parameter value, that is to say the highest update rate, needs to be used. There may also be provision for the smallest transmission parameter value, for example the smallest number of variables in the multitarget message. It is also possible for an optimization criterion for periodicity to be set for example, to the effect that an update rate of 400 per minute and 200 per minute is optimized to an update rate of 400 per minute, since the client device that needs an update rate of 200 per minute can simply ignore every second multitarget message.

Once the optimum transmission parameters for the optimization criterion have then been found, the server device sends each multitarget message by setting the at least one transmission parameter to the respective optimized transmission parameter value. This embodiment results in the advantage that by prescribing an applicable optimization criterion it is possible to take into consideration the technical needs of each client device when stipulating the transmission parameters for the multitarget messages. A development engineer can take the properties of the client devices into consideration selectively by stipulating the optimization criterion for a specific installation.

A further advantage is obtained by virtue of an embodiment having the following step: the server device concludes the transmission process for each multitarget message in each case independently of an acknowledgment of receipt from the client devices. In other words, the transmission device transmits each multitarget message and does not wait for an acknowledgment of success from each client device. Thus, while a cyclic update of process values proceeds, no transmission power is needed from the client device. This is advantageous in terms of energy saving and low utilization of the data network, particularly for mobile devices that accept process values from the server device by means of wireless communication and/or by battery operation. The practice has shown that in many cases it is sufficient for a client device to be informed about changes without the client device needing to react immediately, in a millisecond range. For example the transmission of a fill level or of a gas pressure. In such scenarios, it is entirely adequate for the server to use the described unassured transmission, i.e. without acknowledgment of receipt, to transmit multitarget messages and thereby to be informed about the current state of the process parameters. This means that messages can be lost. To nevertheless ensure sufficient assurance for the transmission, the multitarget messages are preferably sent at a configurable interval of time regardless of a change of value of the process parameters.

The client device is then informed about the current value by the next telegram, without the failure of a messages having a significant influence on the control of the process. It has been found to be particularly suitable to transmit multitarget messages as UDP multitarget messages or UDP broadcast messages (UDP—user datagram protocol). It has been found to be additionally advantageous to transmit the multitarget messages in an AVB stream (AVB—audio video bridging) or TSN stream (TSN—time sensitive network) based on the IEEE 802.1 standard. This streaming technique guarantees a bandwidth and an order for the transmission of multitarget messages. In addition, the channel quality (particularly bandwidth and/or maximum delay) can be fixed by hardware in real time.

To increase performance, it is also possible to negotiate, for a variable group or an subnet, that the transmission of the process values does not contain all information required by the OPC UA standard, for example, but rather that a reduced format can be used. In this regard, an embodiment of the method provides for the step that the server device negotiates with the client devices a respective format requirement for a reduced format of each process parameter, of the subnet, for which the process values are to be transmitted to the respective client device. The server device then forms the subnet by taking into consideration the negotiated format requirement. The effect that can advantageously be achieved thereby is that a multitarget message having particularly little data, i.e. a particularly short multitarget message, will be transmitted. Examples of format changes that can be negotiated without significant influence on the process control are as follows: Only one time stamp for all process values or variables is provided. Only one piece of quality information for all process values is provided. The quality information corresponds to the transmission parameter values. By way of example, it is possible to negotiate with a client device which is to have an update rate of 400 per minute that it receives an update rate of 200 per minute only, so that it requires the same update rate as another client device. The described step of optimization of the transmission parameter values is then easier. It can also be negotiated that no time stamp at all is provided. In this case, it is possible to reduce to a sequence number, for example, so as to continue to keep the order of the process values reconstructable. A client device can also be asked to dispense with its quality information, i.e. its required transmission value parameters, entirely. It is possible to negotiate that the data type of the process values sent is indicated only in the first multitarget message. It is possible to negotiate that the data type is not transmitted at all.

If the server device forms multiple subnet, one embodiment of the method provides for a further advantageous improvement. The server device also forms, in addition to the subnet, a further subnet from at least one process parameter that is to be transmitted to multiple client devices. The server device combines the two subnet and transmits the multitarget message only for the larger of the two subnets at the different transmission times if the smaller subnet is a genuine subset of the larger subnet. If the server device forms the two subnets for different initialization phases, for example, then it can occur that variable groups are subsets of other variable groups. Such subsets are then advantageously not published, i.e. transmitted, separately. The client device receives the group ID, i.e. particularly the group address, of the superordinate group. The client device can then pick out the process values it needs from the multitarget message. This saves one complete multitarget message per transmission time.

The invention also accordingly includes a device for an installation for controlling a process, wherein the device is designed to perform an embodiment of the method according to the invention as a server device. By way of example, the server device may be embodied as an actuator and/or sensor for the installation, that is to say as a valve controller or a sensor device for a pressure and/or a temperature and/or a speed and/or a rotation speed, for example. As an actuator device, the device can comprise a motor controller or a hydraulic controller, for example.

The invention also accordingly includes a device for an installation for controlling a process that can act as a client device. The device is designed to transmit to a server device, an enquiry message that contains an indication of from which of at least one process parameter, which is monitored by the server device, respective process values are to be transmitted to the client device. The client device sends this enquiry message via a data network. The device is furthermore designed to receive from the server device a group address via the data network. Furthermore, the device is designed to receive via the data network, at different transmission times, a respective multitarget message addressed to the group address. Furthermore, the device is designed to read from the received multitarget messages at least one process value contained therein.

As already stated, one and the same device may be embodied either as a server device or as a client device or can be operated as such.

Finally, the invention also includes an installation for controlling a process. What processes may be involved, for example, has already been explained. The installation has at least one server device and multiple client devices according to the invention.

BRIEF DESCRIPTION OF THE DRAWING

An exemplary embodiment of the invention is described below. In this regard.

DETAILED DESCRIPTION OF PREFERRED EMBODIMENTS

The exemplary embodiment explained below is a preferred embodiment of the invention. In the case of the exemplary embodiment, however, the described components of the embodiment are each individual features of the invention that can be considered independently of one another and that each also develop the invention independently of one another and hence can also be regarded as part of the invention individually or in a different combination than that shown. Furthermore, the described embodiment is also augmentable by further instances of the features of the invention that have already been described.

Figure 1:
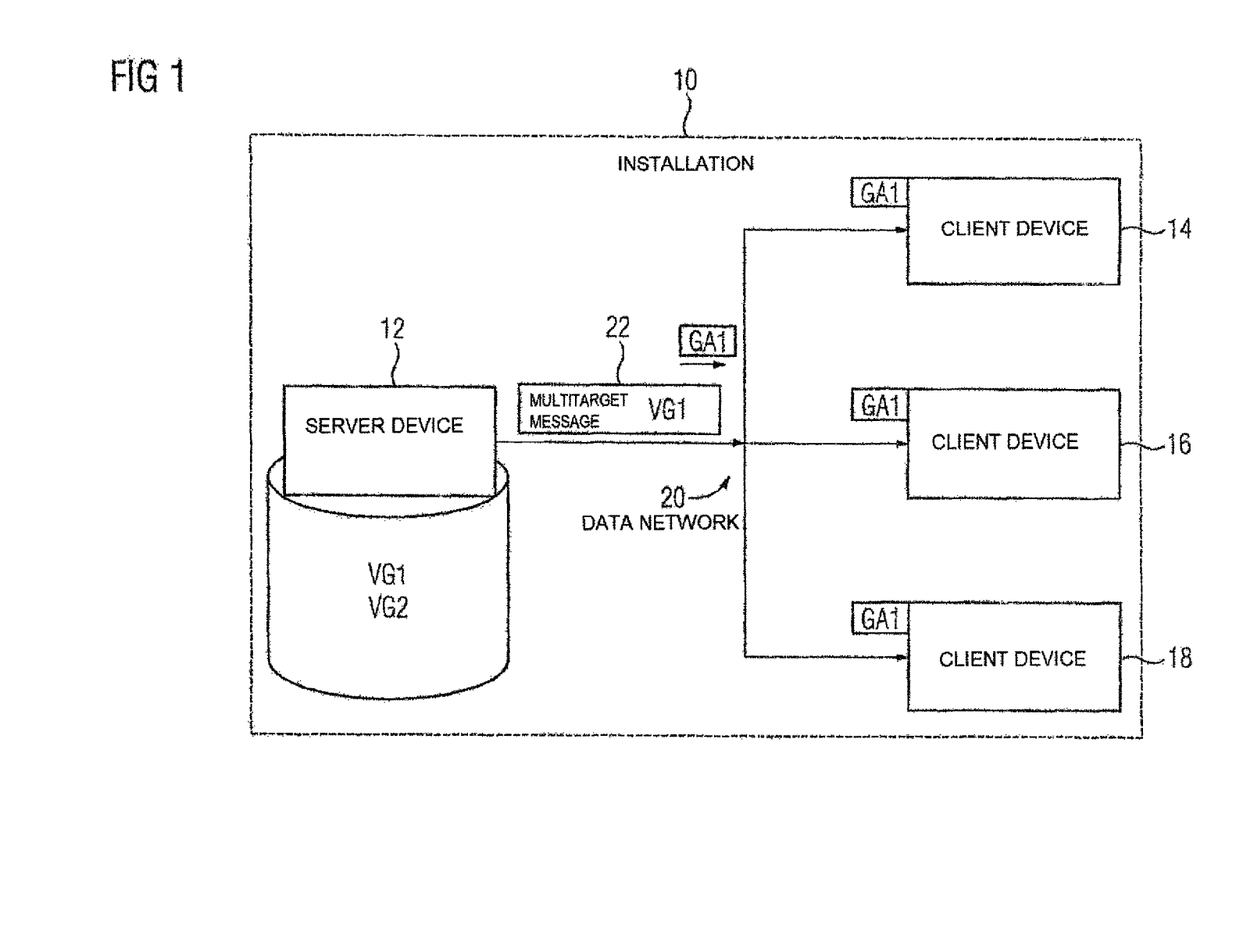
FIG. 1 shows a schematic depiction of an embodiment of the installation according to the invention.

FIG. 1 shows an automation-engineering installation 10. As installation components, the installation 10 can have a server device 12 and multiple client devices 14, 16, 18. The server device 12 may be coupled to the client devices 14, 16, 18 via a data network 20. The devices 12, 14, 16, 18 may be designed to communicate with one another via the data network 20 according to the OPC UA standard.

By way of example, the installation may be designed for controlling a production process, for example the manufacture of a product or of workpieces, for example for motor vehicles. The installation may also be designed for process control, for example for generating power from nuclear power or for purifying sewage. The installation may also be designed to perform a control process, for example traffic control using traffic lights in a road transport network.

Each of the devices 12, 14, 16, 18 may in each case be an actuator and/or sensor for example. Each device 12, 14, 16, 18 is an installation component that monitors and/or influences part of the process to be controlled by the installation 10. The installation 10 can also have further devices (not depicted).

In the example illustrated in FIG. 1, the server device 12 is designed for measuring or ascertaining or monitoring and/or setting process parameters A, B, C, D, H. By way of example, the process parameters may in each case be a temperature or a pressure or a flow rate or an angular position or another variable, a current operating state of the server device 12 and/or of the part of the installation that is monitored and/or controlled by the server device 12. The server device 12 can store, in a processor device, for example a microcontroller or a piece of monitoring software of a CPU (CPU—central processing unit), the respective current process values of the process parameters as variables A, B, C, D, H. Since the process parameters and the process variables A, B, C, D, H representing them can be used synonymously in this description, the same reference symbols are used here. Current process values or variable values are also denoted by these reference symbols here.

Control of the process by the installation 10 may require the client devices 14, 16, 18 to be repeatedly notified of, or have transmitted to them, the current variable values of the variables A, B, C, D, H, i.e. the current process values A, B, C, D, H, in order to themselves be able to control the process. By way of example, there may be provision for the client device 14 (CLNT1), by way of example, to take the variable values A, B, C of the applicable process parameters as a basis for producing, by way of example, control commands or a control signal that controls a circulating pump, for example. By way of example, the client device 16 (CLNT2) can take the variable values A, B, C as a basis for producing control commands or a control signal that controls a conveyor belt, for example. By way of example, the client device 18 can take the variable values A, B, C as a basis for producing a control signal, for example, in order to display a current process state on a screen, for example.

In the installation 10, it may therefore be necessary for the server device 12 to transmit the current variable values of the variables A, B, C to multiple instances of the client devices 14, 16, 18 via the data network 20 repeatedly at different transmission times.

In this context, the installation 10 has provision for the server device 12 not to send each of the variable values A, B, C to the client devices 14, 16, 18 individually, that is to say the variable value A three times, the variable value B three times and the variable value C three times. Instead, the current variable values A, B, C are combined to form a multitarget message 22 that is transmitted into the data network 20 to a single address, namely a group address GA1. The client devices 14, 16, 18 may be configured such that they receive and process the multitarget message 22 if the multitarget message 22 is addressed to the group address GA1.

So that it is known in the server device 12 which variable values A, B, C are to be combined in the multitarget message and are to be transmitted to the group address GA1, the server device 12 may have had subnets or variable groups VG1, VG2 formed in it, each of which stipulates which of the variable values A, B, C, D, H are to be combined into a multitarget message in each case and to which group address GA1, GA2 the respective multitarget message of the respective variable group VG1, VG2 is to be sent.

Figure 2:
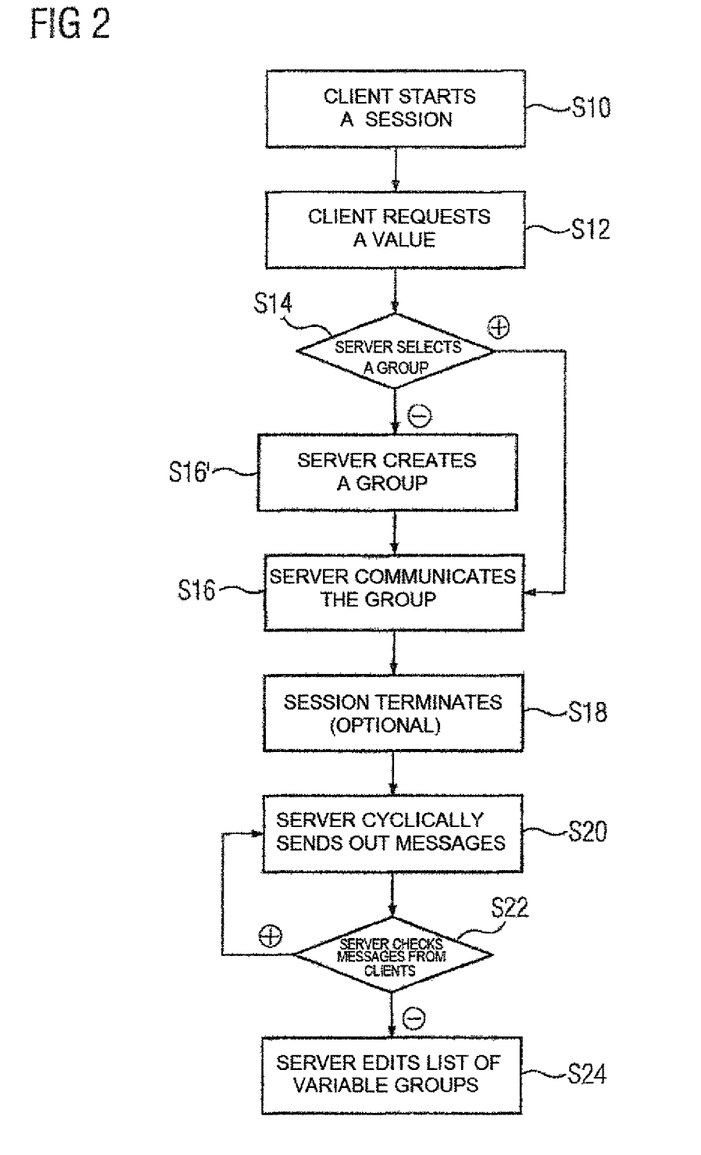
FIG. 2 shows a flowchart for an embodiment of the method according to the invention that can be performed in the installation of FIG. 1.

To form the variable group VG1, VG2, the server device 12 can perform the method described below and illustrated in FIG. 2.

The transmission of multitarget messages is not part of the OPC UA standard. The value changes of the variable values A, B, C are transmitted by means of a nonassured communication outside the OPC UA transport channel. On account of the fact that the value changes are transmitted in unassured fashion, it becomes possible for the same value change to be transmitted to multiple client devices 14, 16, 18 using one message.

The exemplary execution of a communication between the server device, on the one hand, and the client devices 14, 16, 18, on the other, can have the following appearance. In step S10 (SESS START) a client device 14, 16, 18 sets up a session as defined by OPC UA with an OPC UA server, namely in this case the server device 12. The client device notifies the server device 12 of the values (VAR) A, B, C, D, H in which the client device is interested, for example using the inherently known OPC UA mechanism, in step S12. This can also involve transmission properties being communicated, for example what update rate and/or what message size is desired or what value change of a current variable value needs to be transmitted (deadband). In a step S14, the server checks whether it has already formed or defined or published a variable group for the combination of the variable values or for some of the variable values (VG?). If this is the case (symbolized by a "plus sign" in FIG. 2), then the server device 12 notifies the client of the group address GA1, GA2 of the variable group. If there is not yet a suitable variable group (symbolized by a "minus sign" in FIG. 2), then a new variable group is created, and also an ID (identification), i.e. a multitarget address or a group address, is created in an intermediate step S16' before the group address is communicated in step S16.

There may then optionally be provision for the OPC UA session to be terminated in a step S18, so that no further transmission power is needed by the client.

In a step S20, the server device 12 then preferably cyclically sends the multitarget messages 22 with the current values of the desired variable group VG1, VG2 to the group addresses GA1, GA2. The cyclic transmission results in the particular advantage that an unassured transmission, i.e. without the requirement of an acknowledgment of receipt by the client devices 14, 16, 18, can take place. If a multitarget message 22 does not reach one of the client devices 14, 16, 18, then it is certain that current variable values will be transmitted to the client device again in the next transmission cycle.

In a step S22, the server device 12 can check whether a change in the subscriptions has taken place, that is to say whether a client device 14, 16, 18 has signed off from a variable group. To this end, the client device can set up an OPC UA session again in the manner described and alter the quantity of process parameters to be communicated. In step S22, the server device 12 can then check whether each variable group actually still has a member (MEMB). If this is the case (+), then cyclic transmission of the variable values from the variable group is continued in step S20 (SEND VG). When the last client device signs off from a variable group, the latter is either erased from the server device 12 in a step S24 and the server device 12 publishes or transmits no further updates for this variable group (END). As an alternative, it is possible for the variable group to be maintained and only the transmission interrupted. If the variable group is not erased after the last client device signs off, this is advantageous because the variable group does not need to be re-created when a client device signs on for this variable group again, for example.

To implement the described principle of the variable group in the OPC UA standard, there may be provision for the following properties of the variable group. A variable group is a reference to a set of variables and therefore combines them to form an entity. The variables themselves are not part of the variable group. A variable group can be regarded as an atomic set. Should the same variables be addressed in different variable groups, then these can nevertheless be regarded as separate entities. In other words, these variables would be published repeatedly. The data packet that results from the values of a variable group, that is to say the respective multitarget message, needs to be able to be sent in a UDP datagram if the UDP protocol is used.

As the OPC UA session can be terminated in the optional step S18, this results in the advantage that even devices with very low computation power can now be supplied with current process values. A synonymous mechanism between OPC UA and the transmission of process maps becomes possible. For the first time, this allows OPC UA to be used effectively at the field level, that is to say for individual actuators and/or sensors for coupling automation-engineering devices.

Resources are saved in the server because the server does not have to implement management of publish requests and notifications—messages that are part of the OPC UA standard.

Besides the described variant that the properties for the variable values, i.e. the subscription, are negotiated using the OPC UA mechanism, other methods are also possible, for example advance planning or negotiation using a different connection setup, for example specific terminals, that is to say TCP sockets (TCP—transport control protocol), for example.

A client device can also transmit value changes for a variable group in encrypted form. The encryption parameters, for example the key, can be interchanged using the aforementioned methods for negotiating the property of the subscription. This makes certain that the key is transmitted securely.

In order to make certain of the accuracy of the transmission, it is possible to use AVB or TSN streams, for example. These guarantee the bandwidth for the transmission.

The use of UDP can be regarded as exemplary. It is possible to use all transmission channels that support multitarget or broadcast transmissions. Particularly when IPv6 (internet protocol, version 6) is used, it therefore becomes possible to set up such a communication across sub networks.

If the transmission protocol used is a secured protocol, for example TCP, then the update can also be transmitted acyclically. In this case, it is also possible for just value changes to be transmitted instead of a complete process map.

Overall, the example shows how the invention can provide UDP multitarget subscriptions for OPC UA.

What is claimed is:

1. A method of operating a server device in an installation, said installation controlling a process and having multiple client devices connected to a server by a data network, said method of comprising, with the server device in the following order:
receiving from the client devices enquiry telegrams that indicate current process values selected from at least one process parameter that are to be transmitted from the server device to the client devices,
receiving from the client devices respective transmission parameter values defined for each of the client devices, with the respective transmission parameter values representing an update rate for the at least one process parameter, which update rate controls a transmission characteristic of the server device,
forming, based on the enquiry telegrams, intersections of the at least one process parameter, with each intersection defining a specific update rate for that intersection that satisfies a predetermined similarity criterion, which specifies a predetermined maximum absolute difference between the transmission parameters of the client devices,
defining respective group addresses for the intersections and transmitting the respective group addresses to those client devices whose enquiry telegram contains the at least one process parameter of the intersections, and combining the current process values of the at least one process parameter specific for each intersection into a respective single multitarget telegram and transmitting the respective multitarget telegram for each intersection only to the client device having the group address of a respective intersection.

2. The method of claim 1, further comprising the step of the server device receiving an enquiry telegram via a network connection from at least one of the client devices in a configuration phase during an OPC-UA session in accordance with OPC-UA standard.

3. The method of claim 1, wherein the server device negotiates with respective client devices a reduced format requirement for each process parameter to be transmitted to a respective client device, the format requirement being used by the server device to select the client devices in the intersection.

4. The method of claim 1, further comprising:
the server device ascertaining an optimum transmission parameter value for at least one transmission parameter for the intersection on the basis of all transmission parameter values prescribed for the client devices in the intersection, using a predetermined optimization criterion,
the server device sending each multitarget message by setting the at least one transmission parameter to the optimum transmission parameter value.

5. The method of claim 1, wherein, in addition to said intersection, at least one further intersection is formed for at least one of the process parameters that is to be transmitted to multiple client devices.

6. The method of claim 5, wherein the server device combines the two intersections and transmits a multitarget message only to the lamer of the two intersections, if the smaller message is a subset of the larger intersection.

7. A server device adapted to be connected to client devices by a data network in an installation that controls a process, said server device comprising:
a data processor, said data processor ascertaining a current process value at different transmission times for at least one process parameter of the process, and
a transmitter, said transmitter transmitting the ascertained current process value for each process parameter or a subset of the process parameters at each transmission time to multiple client devices in the installation via the data network, said data processor forming an intersection of more than one of the client devices for at least one process parameter that is to be transmitted to the intersection at a group address, said server device combining the current process values of the at least one process parameter into a single multitarget message in the form of a data record or a message at each transmission time and transmitting the multitarget message to the group address of the intersection in the data network,
wherein the server device receives from the client devices enquiry telegrams telegram that indicate current process values selected from at least one process parameter that are to be transmitted to the client device devices,
wherein the server device receives from the client devise devices respective transmission parameter values defined for each of the client devices, with the respective transmission parameter values representing an update rate for the at least one process parameter which update rate controls a transmission behavior of the server device, wherein the server device forms, based on the enquiry telegrams, intersections of the at least one process parameter, with each Intersection defining a specific update rate for that intersection that satisfies a predetermined similarity criterion, which specifies a predetermined maximum absolute difference between the transmission parameters of the client devices,
defines respective group addresses for the intersections and transmits the respective group addresses to those client devices whose enquiry telegram contains the at least one process parameter of the intersections, and
combines the current process values of the at least one process parameter specific for each intersection into a respective single multitarget telegram and transmits the respective multitarget telegram for each intersection only to the client device having the group address of a respective intersection.

8. A client device adapted to be connected to at least one server device by a data network in an installation that controls a process, said client device comprising:
a data processor, said data processor providing an enquiry message that indicates which of at least one process parameter respective process value is to be transmitted to the client device,
a transmitter adapted to transmit the enquiry message to a server device via the data network; and
a receiver adapted to receive a multitarget message in the form of a data record or a message from the server device at a group address assigned to the client by at least one server via the data network at different transmission times, and to read from the multitarget message at least one process value contained therein,
wherein the at least one server device receives from the client devices enquiry telegrams that Indicate current process values selected from at least one process parameter that are to be transmitted to the client devices,
wherein the server device receives from the client devices respective transmission parameter values defined for each of the client devices, with the respective transmission parameter values representing an update rate for the at least one process parameter which update rate controls a transmission behavior of the server device,
wherein the server device forms, based on the enquiry telegrams,
intersections of the at least one process parameter with each intersection defining a specific update rate for that intersection that satisfies a predetermined similarity criterion, which specifies a predetermined maximum absolute difference between the transmission parameters of the client devices,
defines respective group addresses for the intersections and transmits the respective group addresses to those client devices whose enquiry telegram contains the at least one process parameter of the intersections, and
combines the current process values of the at least one process parameter specific for each intersection into a respective single multitarget telegram and transmits the respective multitarget telegram for each intersection only to the client device having the group address of a respective intersection.

9. An Installation adapted to control a process, said Installation comprising:
a data network connecting multiple client devices; and
at least one server device connected to the client devices by the data network, said server device ascertaining a current process value of the process at different transmission times for at least one process parameter of the process, said server device forming an intersection of more than one of the client devices for the at least one ascertained process parameter that is to be transmitted to multiple client devices, said intersection having a group address, said at least one server device transmitting the respective ascertained current process value via the data network for each process parameter or a subset of the process parameters at each respective transmission time to multiple client devices in the installation as a single multitarget message in the form of a data record or a message at each transmission time to the group address of the intersection in the data network, wherein the server device receives from the client devices enquiry telegrams that indicate current process values selected from at least one process parameter that are to be transmitted to the client devices, wherein the server device receives from the client devices respective transmission parameter value values defined for each of the client devices, with the respective transmission parameter values representing an update rate for the at teas! one process parameter' which update rate controls a transmission behavior of the server device, wherein the server device forms, based on the enquiry telegrams, intersections of the at least one process parameter, with each intersection defining a specific update rate for that intersection that satisfies a predetermined similarity criterion, which specifies a predetermined maximum absolute difference between the transmission parameters of the client devices;

defines respective group addresses for the intersections and transmits the respective group addresses to these client devices whose enquiry telegram contains the at least one process parameter of the intersections, and combines the current process values of the at least one process parameter specific for each intersection into a respective single multitarget telegram and transmits the respective multitarget telegram for each intersection only to the client device having the group address of a respective intersection.

* * * * *